(12) United States Patent
Simon et al.

(10) Patent No.: US 8,139,554 B1
(45) Date of Patent: Mar. 20, 2012

(54) PROVIDING BOUNDED LATENCY COMMUNICATION IN WIRELESS MESH NETWORKS

(75) Inventors: Jonathan Simon, Castro Valley, CA (US); Lance R. Doherty, Berkeley, CA (US)

(73) Assignee: Dust Networks, Inc., Hayward, CA (US)

( * ) Notice: Subject to any disclaimer, the term of this patent is extended or adjusted under 35 U.S.C. 154(b) by 404 days.

(21) Appl. No.: 11/649,342

(22) Filed: Jan. 3, 2007

Related U.S. Application Data

(60) Provisional application No. 60/756,240, filed on Jan. 3, 2006.

(51) Int. Cl.
*H04J 3/24* (2006.01)

(52) U.S. Cl. .... 370/349; 455/18; 455/242.1; 455/243.1; 455/403; 370/418

(58) Field of Classification Search .......... 370/222–228, 370/230, 230.1, 231, 235, 351–430
See application file for complete search history.

(56) References Cited

U.S. PATENT DOCUMENTS

| | | | |
|---|---|---|---|
| 5,881,051 A * | 3/1999 | Arrowood et al. | 370/248 |
| 6,044,062 A | 3/2000 | Brownrigg et al. | |
| 6,249,516 B1 | 6/2001 | Brownrigg et al. | |
| 6,567,416 B1 * | 5/2003 | Chuah | 370/418 |
| 6,816,464 B1 * | 11/2004 | Scott et al. | 370/252 |
| 6,856,811 B2 | 2/2005 | Burdue et al. | |
| 7,000,021 B1 * | 2/2006 | Radhakrishnan et al. | 709/230 |
| 7,054,271 B2 | 5/2006 | Brownrigg et al. | |
| 7,103,511 B2 | 9/2006 | Petite | |
| 2004/0008663 A1 * | 1/2004 | Srikrishna et al. | 370/351 |
| 2004/0032847 A1 * | 2/2004 | Cain | 370/338 |

* cited by examiner

*Primary Examiner* — Kamran Afshar
*Assistant Examiner* — Shahriar Behnamian
(74) *Attorney, Agent, or Firm* — Van Pelt, Yi & James LLP

(57) ABSTRACT

Communicating using a mesh network is disclosed. A frame length used for communicating a packet between a first node and a second node of a wireless mesh network is selected. A route from the first node to the second node is determined including one or more intermediate nodes that receive and transmit the packet. Node to node communications within the frame along the route is selected such that a communication latency time is below a predetermined limit time for a predetermined percentage of communications between the first node and the second node.

27 Claims, 13 Drawing Sheets

PROVIDING BOUNDED LATENCY COMMUNICATION IN WIRELESS MESH NETWORKS

CROSS REFERENCE TO OTHER APPLICATIONS

This application claims priority to U.S. Provisional Patent Application No. 60/756,240 entitled PROVIDING LOW LATENCY COMMUNICATION IN WIRELESS MESH NETWORKS filed Jan. 3, 2006 which is incorporated herein by reference for all purposes.

BACKGROUND OF THE INVENTION

Wireless mesh networks can carry packets of information from one node of the network to another. Typically, packets that do not succeed in their transmission from one node to another will retry at a next available transmission slot. However, this slot may not come until the next cycle of a frame that describes node to node communications in the mesh network. It would be beneficial to be able to specify a quality of service for the packet in traversing the network.

BRIEF DESCRIPTION OF THE DRAWINGS

Various embodiments of the invention are disclosed in the following detailed description and the accompanying drawings.

DETAILED DESCRIPTION

Figure 1:
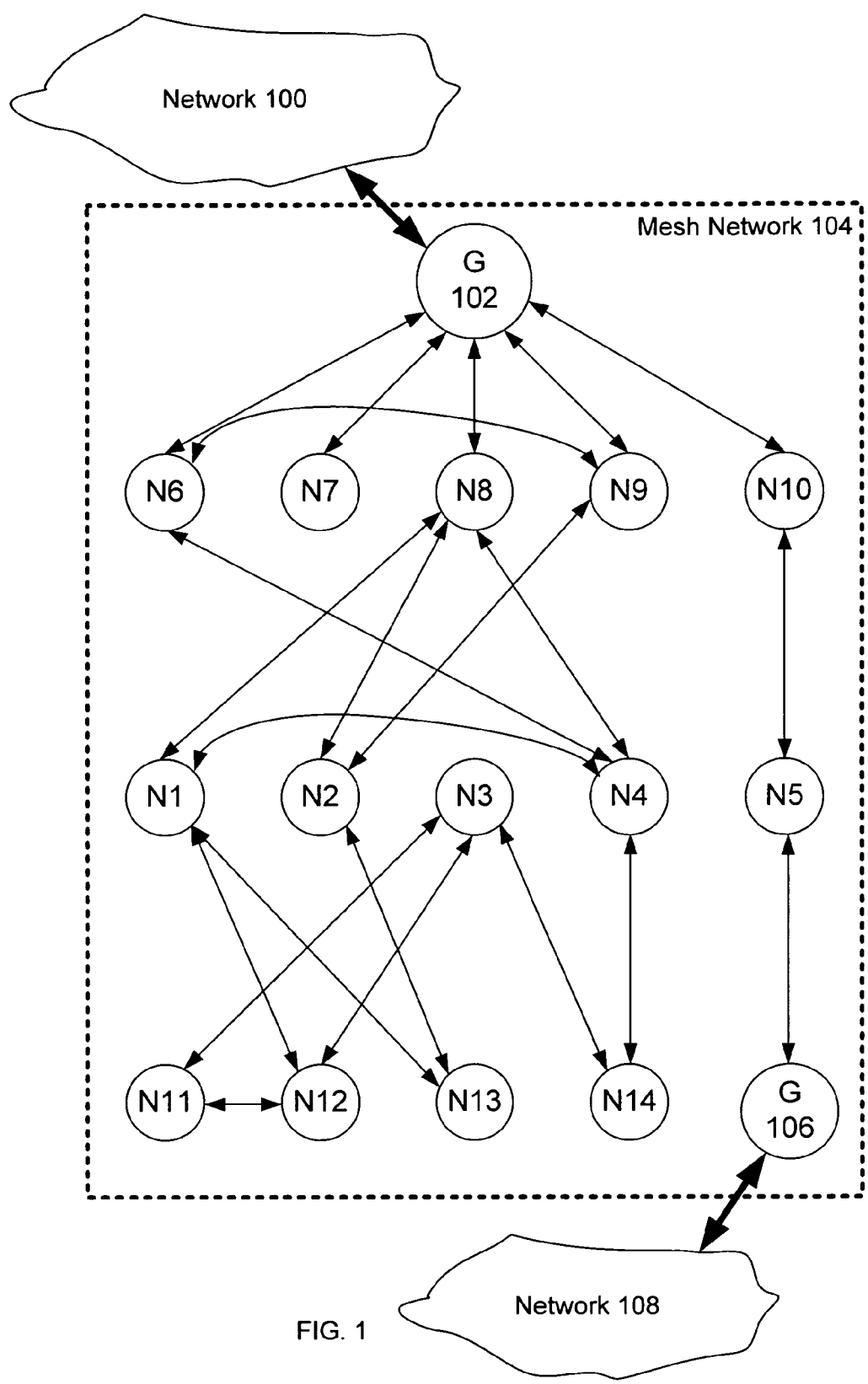
FIG. 1 is a block diagram illustrating an embodiment of a mesh network.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Communicating using a mesh network is disclosed. A frame with node to node communications is designated such that communications using a packet between a first node and a second node have a communication latency time below a predetermined limit time for a predetermined percentage of communications. A route is determined from the first node to the second node including one or more intermediate nodes that receive and transmit the packet. The frame is designated using batches of retries for each hop along a route between the first node and the second node. The number of retries in a batch for one of the hops along the route is determined based on the predetermined percentage of communications requirement as well as the reliability of the communication between the first node and the second. In some embodiments, the frame length is selected to be the predetermined limit time for the communication between the first node and the second node.

In some embodiments, a number of routes are chosen that cover all the network nodes. In various embodiments, the chosen route is selected to reduce the maximum route length or to reduce the expected number of transmissions along the route.

In some embodiments, the transmitter does not transmit a packet in a retry slot of a frame if the transmitter has already received an acknowledgement that the packet was received after being transmitted in a prior slot. In some embodiments, the receiver does not listen for a packet in a retry slot of a frame if the receiver has already received a packet in a prior slot and has already transmitted an acknowledgement that the packet was received.

FIG. 1 is a block diagram illustrating an embodiment of a mesh network. In the example shown, mesh network 104 can communicate with network 100. Network 100 is a communication network and may be a local area network, a wide area network, the Internet, a wired network, a wireless network, or any other appropriate communication network. Mesh network 104 includes gateway nodes and mesh network nodes. Gateway nodes are represented in FIG. 1 as G 102 and G 106. The gateway node is able to communicate directly with a network—network 100 and network 108, respectively—and with mesh network nodes. For example, G 102 is able to directly communicate with N6, N7, N8, N9, and N10. The gateway node may also act as a mesh network coordinator sending to and receiving from the mesh network nodes information, configuration, status updates, etc. In some embodiments, there are multiple gateway nodes that can communicate with the same network (e.g., network 100) or one or more different networks. Mesh network nodes are represented in FIG. 1 as N1-N14. A mesh network node can communicate with other mesh network nodes and gateway nodes. In some embodiments, mesh network nodes are sensor or device mesh network nodes. For example, mesh network node N5 is able to communicate directly with mesh network node N10 and with gateway node G 106. In various embodiments, the connections allow communication only in one direction (i.e., to a node or from a node) or in both directions (i.e., both to and from a node).

In the example shown in FIG. 1, gateway and mesh network nodes communicate via radio transmitters and receivers using a packet. A packet may include a header section and a data section. The packet header may include information regarding packet type, time sent, source node, destination node, node health, number of tries for a hop, number of hops, etc. The packets are sent during defined time slots on defined frequencies using a time division multiple access (TDMA) methodology. In various embodiments, other methodologies for wireless or wired communications are used such as carrier sense multiple access (CSMA), code division multiple access (CDMA), global system for mobile communication (GSM), Transmission Control Protocol/Internet Protocol (TCP/IP), or any other appropriate network communication methodologies.

Figure 2:
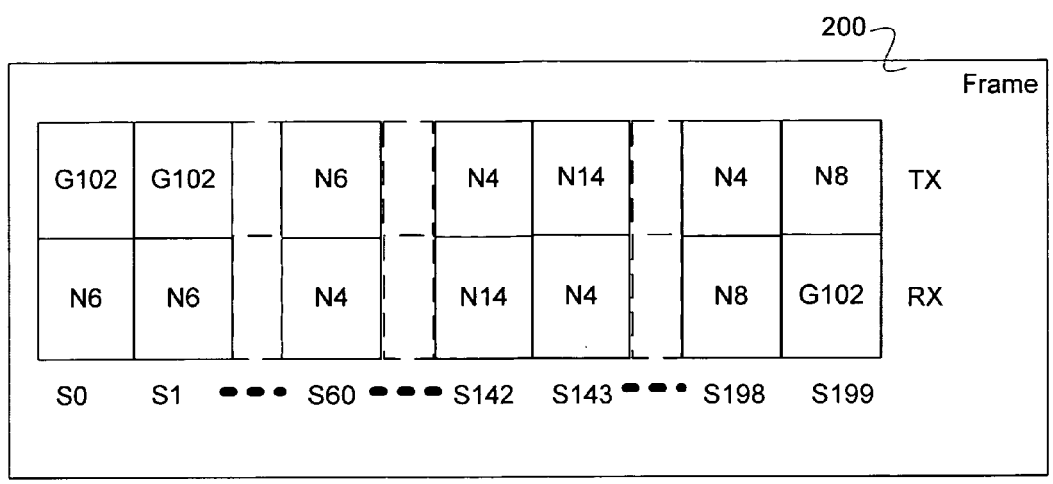
FIG. 2 is a block diagram illustrating an embodiment of a frame.

FIG. 2 is a block diagram illustrating an embodiment of a frame. In the example shown, frame 200 includes time slots that can be used to designate a receiver and transmitter. During the time slot a designated transmitter node transmits to a designated receiver node of a mesh network. In various embodiments, the frequency used for transmission and reception is fixed, is selected from a pool of frequencies, rotates in a fixed manner, is randomly assigned, or any other appropriate manner of assigning frequency to a transmission and reception. In some embodiments, the frequency comprises a frequency in the ISM band from 902.5 MHZ to 927.5 MHz. Frame 200 is repeated after executing the transmissions/receptions for all of its time slots. The network can support several different frames either running at different times or running concurrently. Some frames have only a few slots some have many slots depending on their design. Frame 200 contains 200 time slots (represented by S0, S1, S60, S142, S143, S198, and S199). Transmission links in the mesh network are assigned cells in a frame during which then can communicate. The transmissions and receptions for the frame are represented by designating a transmitter and a receiver for a given time slot. In S0 and S1, gateway G102 sends to node N6. In S60, node N6 sends to node N4. In S142, node N4 sends to node N14. In S143, node N14 sends to node N4. In S198, node N4 sends to node N8. In S199, node N8 sends to gateway G102.

Figure 3:
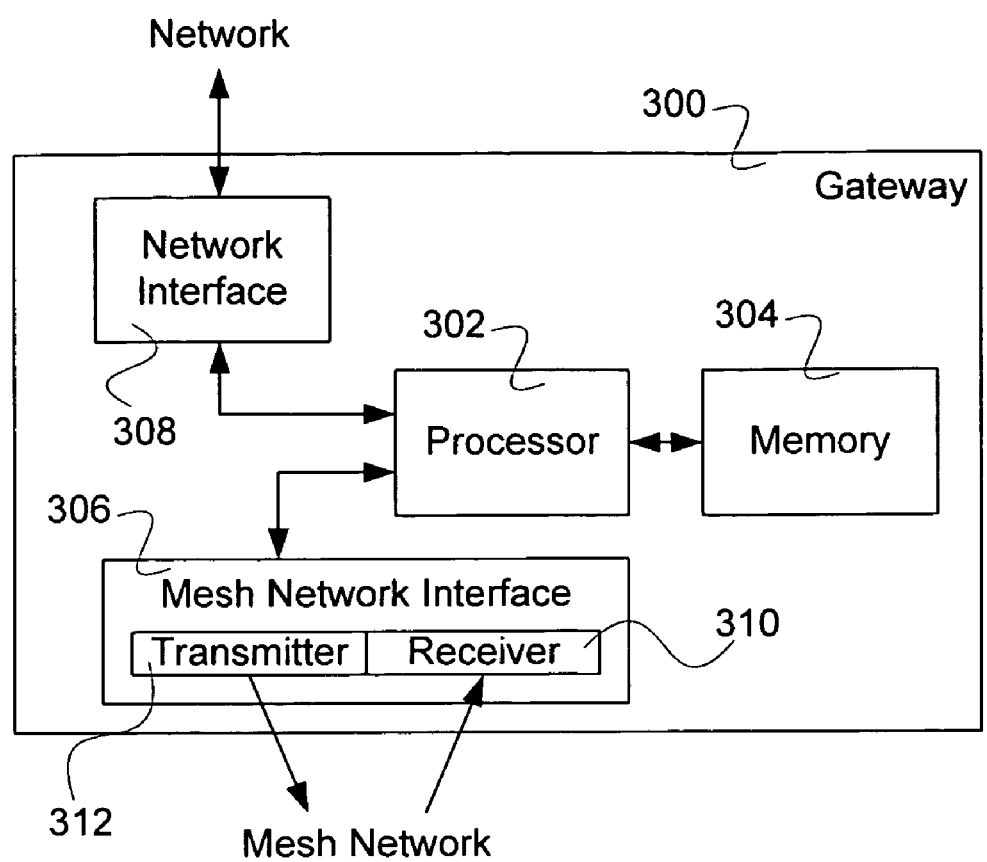
FIG. 3 is a block diagram illustrating an embodiment of a gateway of a mesh network.

FIG. 3 is a block diagram illustrating an embodiment of a gateway of a mesh network. In some embodiments, the gateway 300 of FIG. 3 is used to implement G 102 and/or G 106 in FIG. 1. In the example shown, gateway 300 includes processor 302, memory 304, mesh network interface 306, and network interface 308. Processor 302 runs software that when executed manages the mesh network. Management of the mesh network can include network setup, adding nodes, removing nodes, adding frames to the network, removing frames, monitoring status, optimizing network performance by reconfiguring frames, time synchronization, and/or any other appropriate network management function. Memory 304 provides storage for processor 302 including run-time storage and instruction storage. Mesh network interface 306 includes receiver 310 and transmitter 312. Receiver 310 receives communications in the form of packets transmitted from the mesh network. Transmitter 312 transmits communications in the form of packets to the mesh network. Network interface 308 communicates with a communication network comprising of one or more devices. Information from the mesh network is passed directly to or processed by gateway 300 using processor 302 before passing to the communication network. In some embodiments, gateway 300 is line powered so that power limitations due to finite battery reserves are not an issue. In various embodiments, network management is accomplished by a remote application or is coordinated by a node in the network.

Figure 4:
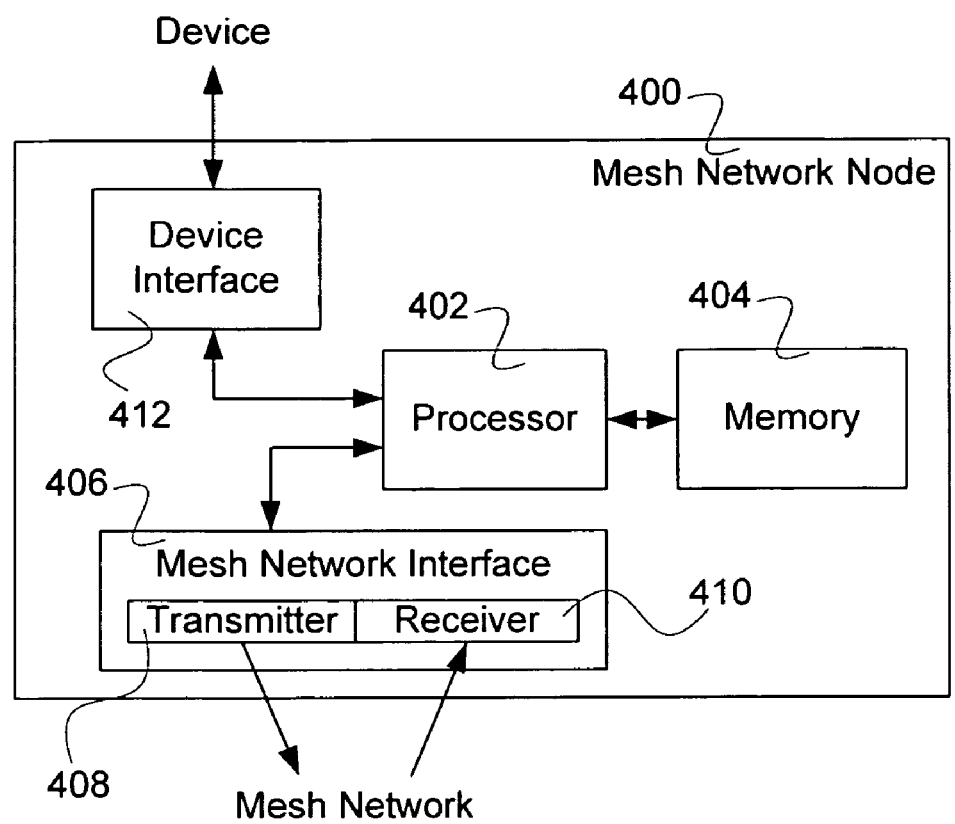
FIG. 4 is a block diagram illustrating an embodiment of a mesh network node of a mesh network.

FIG. 4 is a block diagram illustrating an embodiment of a mesh network node of a mesh network. In some embodiments, the mesh network node 400 of FIG. 4 is used to implement nodes N1-N14 in FIG. 1. In the example shown, mesh network node 400 includes processor 402, memory 404, mesh network interface 406, and device interface 412. Processor 402 runs software that when executed operates the mesh network node. Operation of the mesh network node can include setup, receiving messages, transmitting messages, adding capacity, removing capacity, providing status reports to a gateway manager such as gateway 300 in FIG. 3, time synchronization, and/or any other appropriate operating function. Memory 404 provides storage for processor 402 including run-time storage and instruction storage. Mesh network interface 406 includes receiver 410 and transmitter 408. Receiver 410 receives communications in the form of packets transmitted from the mesh network. Transmitter 408 transmits communications in the form of packets to the mesh network. In some embodiments, mesh network node 400 is usually battery powered so that power limitations due to finite battery reserves are an issue. Device interface 412 communicates with a device and/or sensor. Device and/or sensor types that can be connected to mesh network node include temperature sensors, strain sensors, image sensors, vibration sensors, fluid level sensors, chemical sensors, gas sensors, radiation detectors, position sensors, acceleration sensors, inclination sensors, shock sensors, infrared sensors, sound sensors, current sensors, voltage sensors, switching device, actuator device, or any other appropriate device and/or sensor. Information to/from the sensor and/or device is passed directly to or processed by sensor mesh network node 400 using processor 402 before passing from/to the mesh network.

Figure 5:
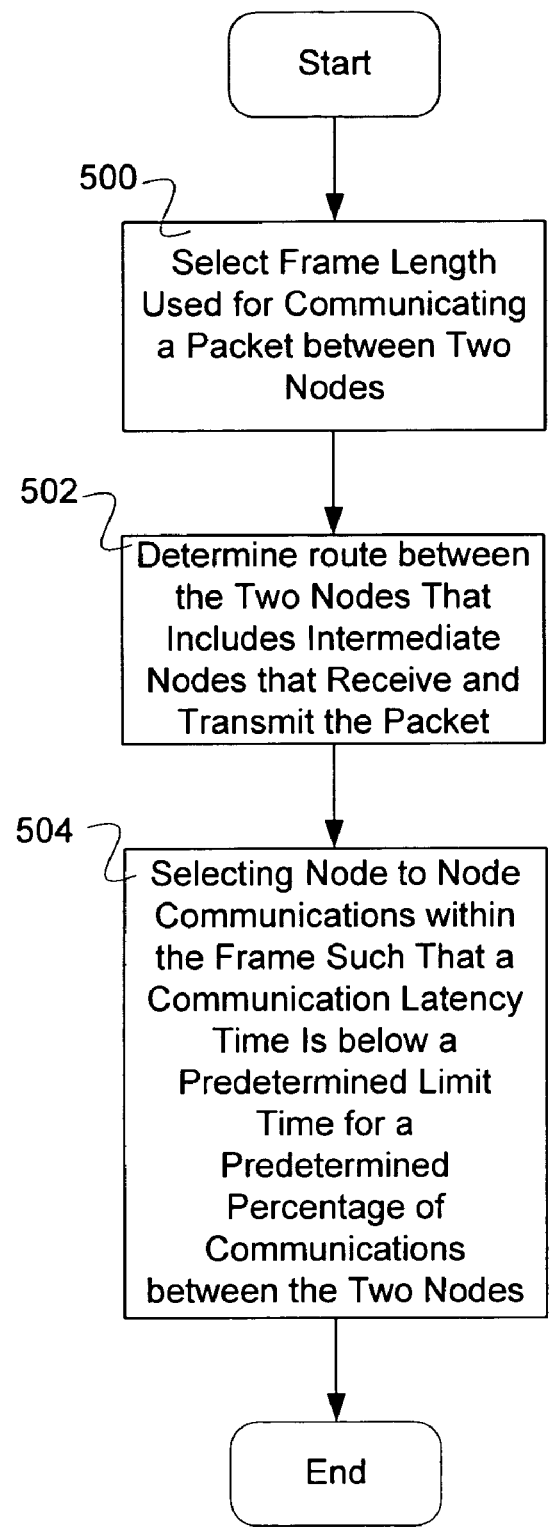
FIG. 5 is a flow diagram illustrating an embodiment of a process for communicating using a mesh network.

FIG. 5 is a flow diagram illustrating an embodiment of a process for communicating using a mesh network. In some embodiments, the process of FIG. 5 is used to designate a frame such as frame 200 of FIG. 2. In the example shown, in 500 a frame length is selected that is used in communicating between two nodes. In 502, node to node communications are selected within the frame such that a communication latency time is below a predetermined limit time for a predetermined percentage of communications between the two nodes. For example, a frame length of 6 seconds is selected in which communication between a gateway such as gateway G 102 of FIG. 1 and a node such as node N14 of FIG. 1 is below 5 seconds 99.99% of the time. Node to node communications are designated in a frame where sufficient repetition enables a 99.99% reliability of communication despite a node to node communication error rate of, for example, 10%. Also, the node to node communications are designated such that a message can travel between the gateway and the node within the designated time of 5 seconds. In this case, the designated time does not correspond to the frame length.

Figure 6:
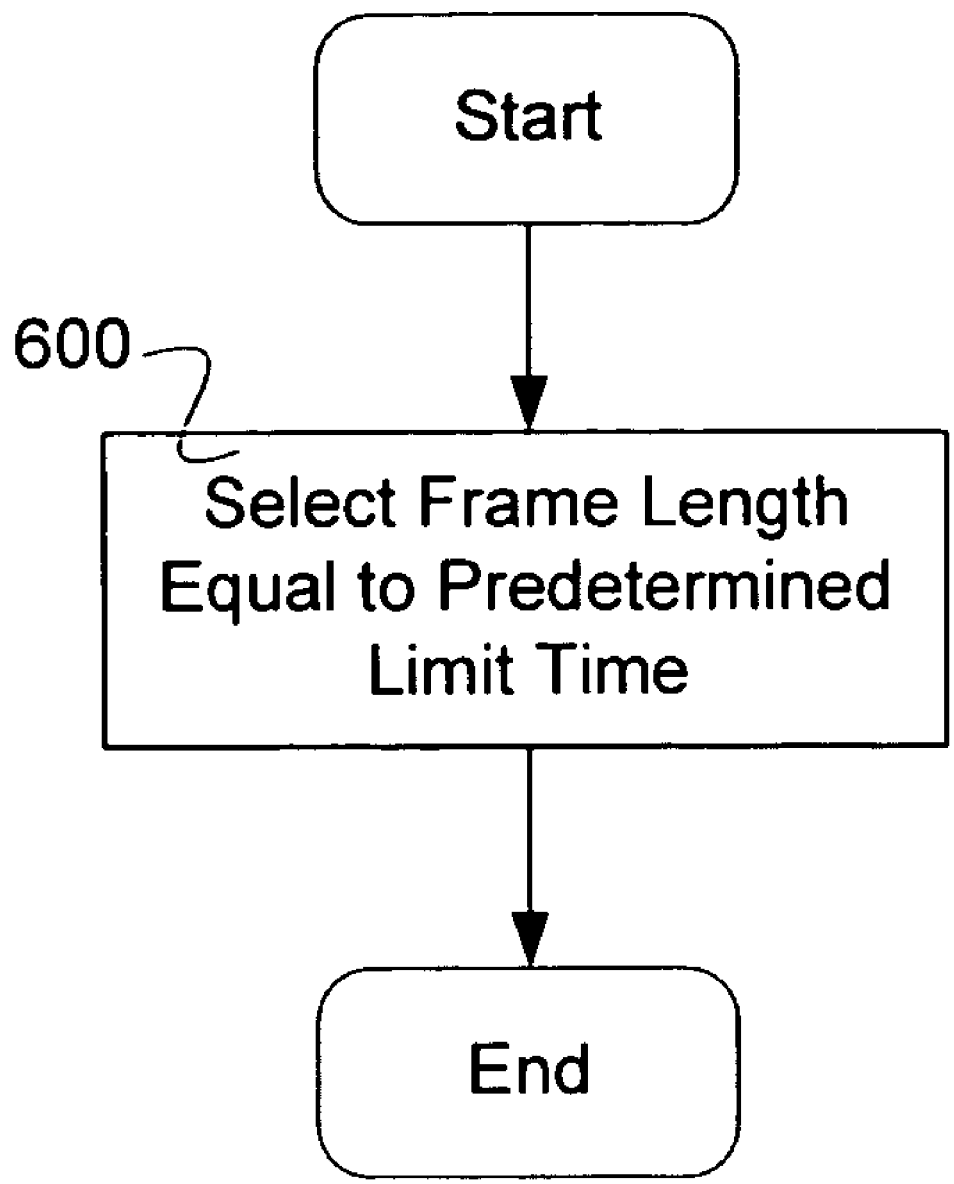
FIG. 6 is a flow diagram illustrating an embodiment of a process for selecting a frame length.

FIG. 6 is a flow diagram illustrating an embodiment of a process for selecting a frame length. In some embodiments, the process of FIG. 6 is used to implement 500 of FIG. 5. In the example shown, in 600 the frame length is selected to be equal to the predetermined limit time.

Figure 7:
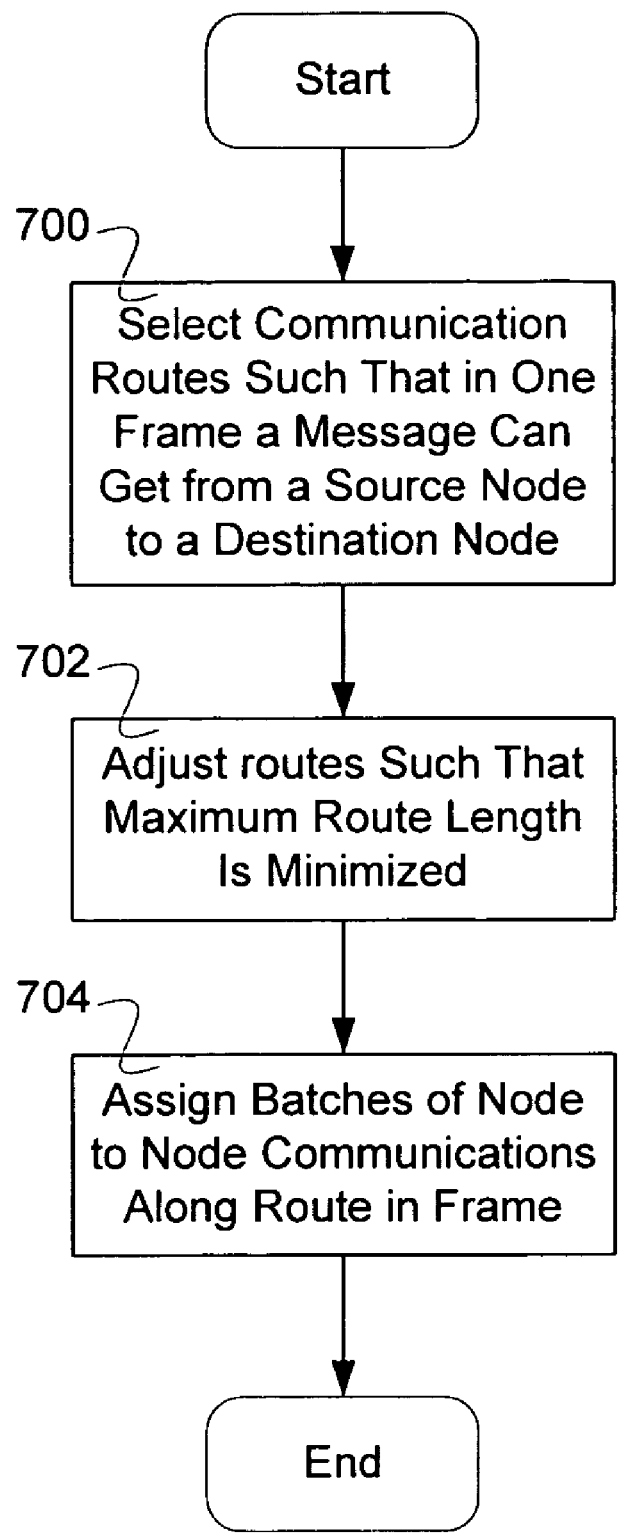
FIG. 7 is a flow diagram illustrating an embodiment of a process for selecting node to node communications in a frame.

FIG. 7 is a flow diagram illustrating an embodiment of a process for selecting node to node communications in a frame. In some embodiments, the process of FIG. 7 is used to implement 502 of FIG. 5. In the example shown, in 700 one or more routes comprising of one or more communication paths is selected such that in one frame a message can get from a source node to a destination node. In various embodiments, the source node comprises a gateway node or a mesh network node and the destination node comprises a gateway node or a mesh network node. In 702, paths are adjusted such that the maximum path length is minimized. In 704, batches of node to node communication slots are assigned along a route in the frame. The batches are retries of a node to node communication, typically repeats of transmitter/receiver pairs, so that a guarantee can be made that a packet will successfully transmit from a first node to a second node along a path in the mesh network.

Figure 8:
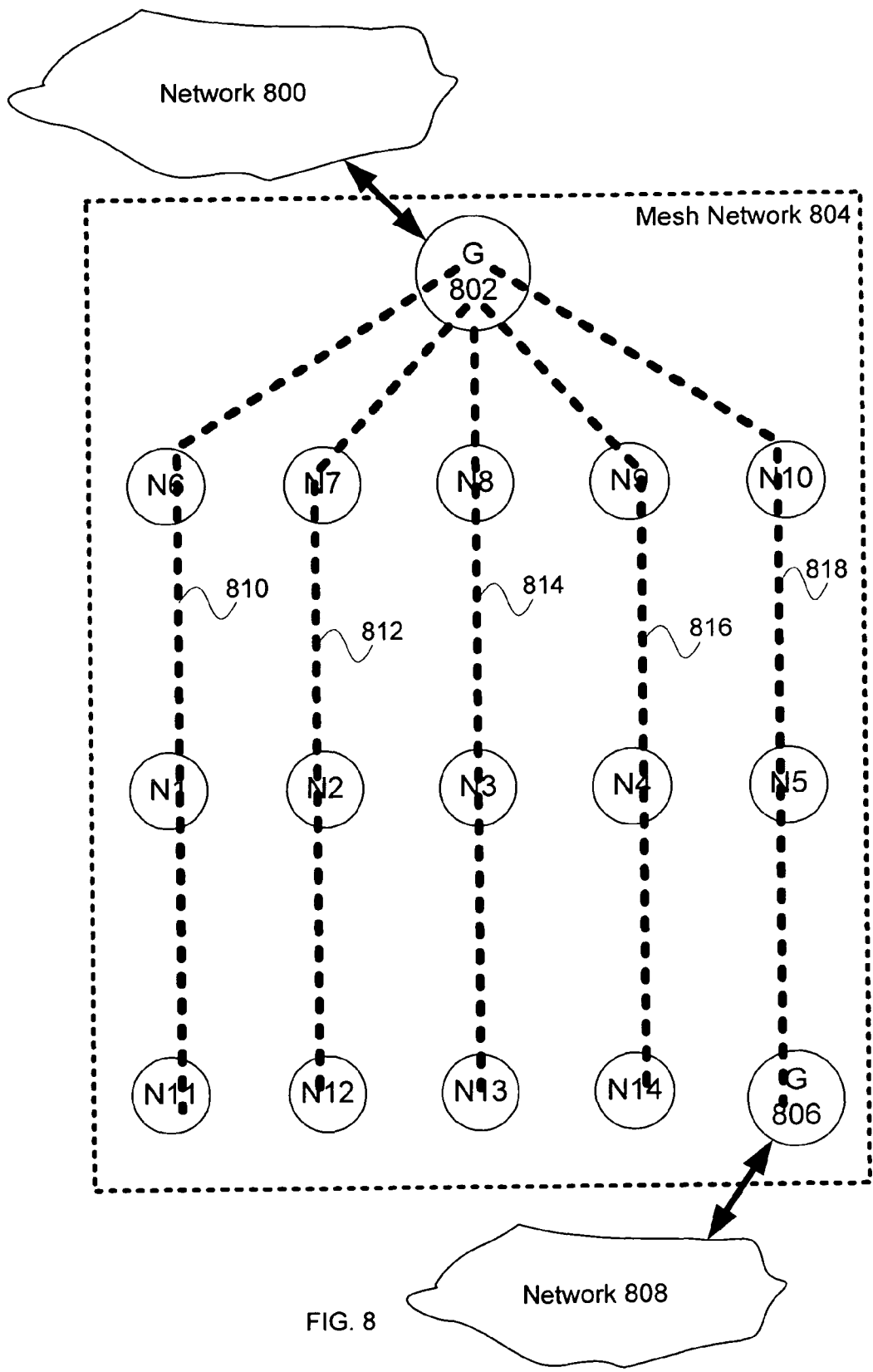
FIG. 8 is a block diagram illustrating an embodiment of a mesh network.

FIG. 8 is a block diagram illustrating an embodiment of a mesh network. In some embodiments, the network of FIG. 8 is a network for which the process of FIG. 7 is being applied. In the example shown, mesh network 804 includes mesh network nodes N1-N14 and gateway nodes G802 and G806. Gateway node G802 can communicate between mesh network 804 and network 800. Gateway node G806 can communicate between mesh network 804 and network 808. Five routes—810, 812, 814, 816, and 818—are drawn from gateway G 802 such that the route length to any node is at most 3 hops (i.e., nominally three transmissions from one node to another). So, to route from gateway 802 to nodes N6, N1, or N11 route 810 is used. Similarly, from gateway 802 to nodes N7, N2, or N12 route 812; to nodes N8, N3, or N13 route 814; to nodes N9, N4, or N14 route 816; to nodes N10, N5, or gateway 806 route 818 is used.

Figure 9:
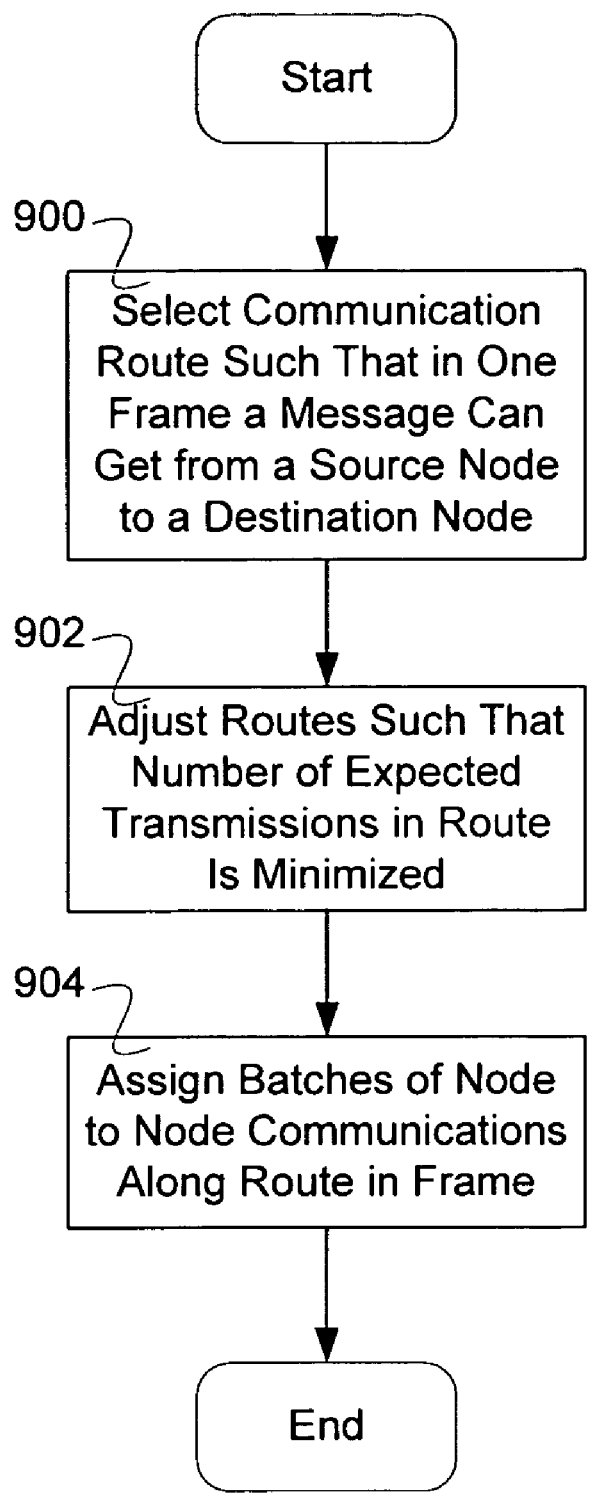
FIG. 9 is a flow diagram illustrating an embodiment of a process for selecting node to node communications in a frame.

FIG. 9 is a flow diagram illustrating an embodiment of a process for selecting node to node communications in a frame. In some embodiments, the process of FIG. 9 is used to implement 502 of FIG. 5. In the example shown, in 900 one or more routes comprising of one or more communication paths are selected such that in one frame a message can get from a source node to a destination node. In various embodiments, the source node comprises a gateway node or a mesh network node and the destination node comprises a gateway node or a mesh network node. In 902, routes are adjusted such that the number of expected transmissions in path is minimized. The error rate for a given path (or "hop") is known or measured to determine the number of expected transmissions in a hop. The number of expected transmissions in each hop is used to calculate the number of expected transmissions in the route from a source node to a destination node. If a hop has a very high error rate, then a route with that hop in it may need to have very few hops in order to minimize the expected transmissions in that route. In some embodiments, the number of expected transmission in a hop is equal to 1/(1-PER) where PER is the packet error rate for that hop, or the number of successes divided by the number of transmissions. For example, if the PER is 50% then on average the number of expected transmissions is 2. To guarantee a successful transmission to a given confidence level, more than the average number of expected transmissions is sometimes necessary. In 904, batches of node to node communications are assigned along a path in the frame. The batches are retries of a node to node communication, typically repeats of transmitter/receiver pairs, so that a guarantee can be made that a packet will successfully transmit from a first node to a second node along a path in the mesh network. If a hop has a very high error rate, then the batch of retries for that hop may be very large (i.e., a large number of retries).

Figure 10:
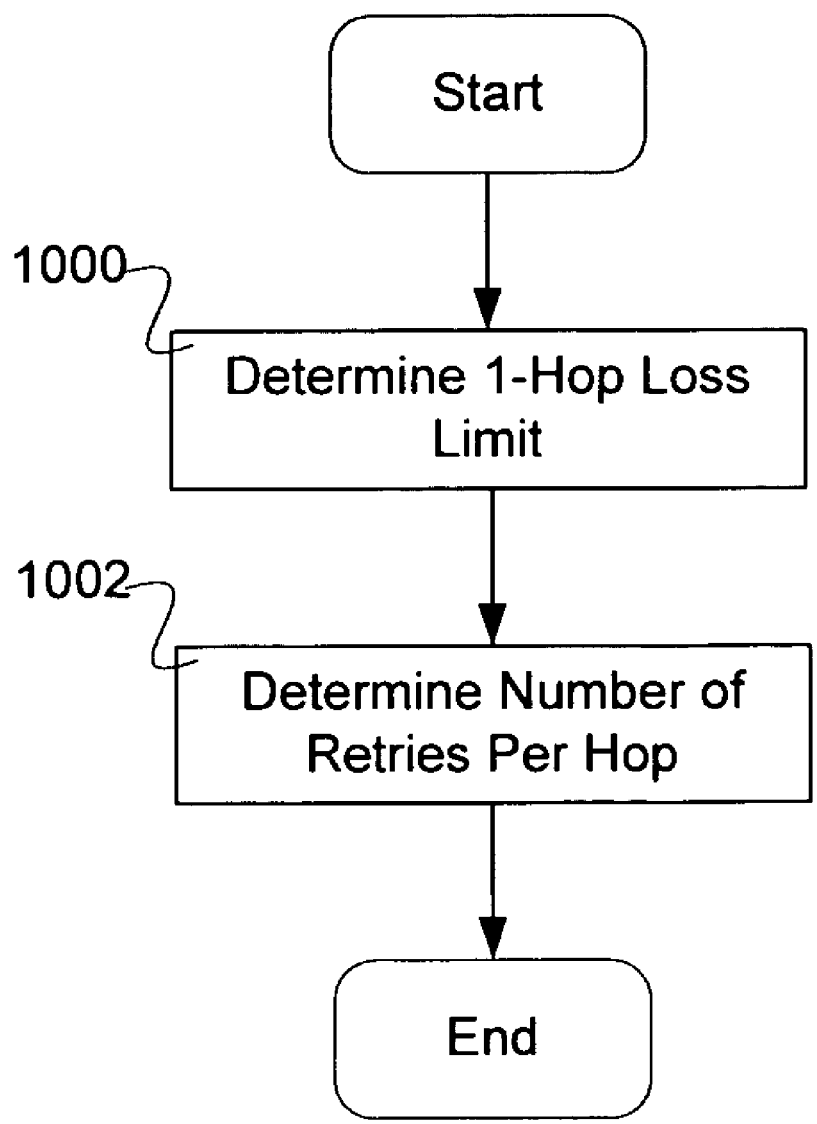
FIG. 10 is a flow diagram illustrating a process for determining a batch of node to node communications.

FIG. 10 is a flow diagram illustrating a process for determining a batch of node to node communications. In some embodiments, the process of FIG. 10 is used to implement 704 of FIG. 7 or 904 of FIG. 9. In the example shown, in 1000 the 1-hop loss limit is determined. For example, a guarantee rate of 99.99% in 3 hops is desired. The 1-hop loss limit (y) is determined as $y = 1 - g^{1/h}$, where g is the guarantee rate (e.g., 99.99%) and h is the number of hops (e.g., 3). In this case, $y \approx 3 \times 10^{-5}$. In 1002, the number of retries per hop is determined. For example, for the 1-hop loss limit $y \approx 3 \times 10^{-5}$ and the path error rate PER=10%, the number of retries $N_{TX}$ is given by $N_{TX} = \log(y)/\log(PER)$. In this case, $N_{TX} \approx 4.5$, which is rounded up to 5 to determine the number of retries for the node to node communication in the frame.

Figure 11:
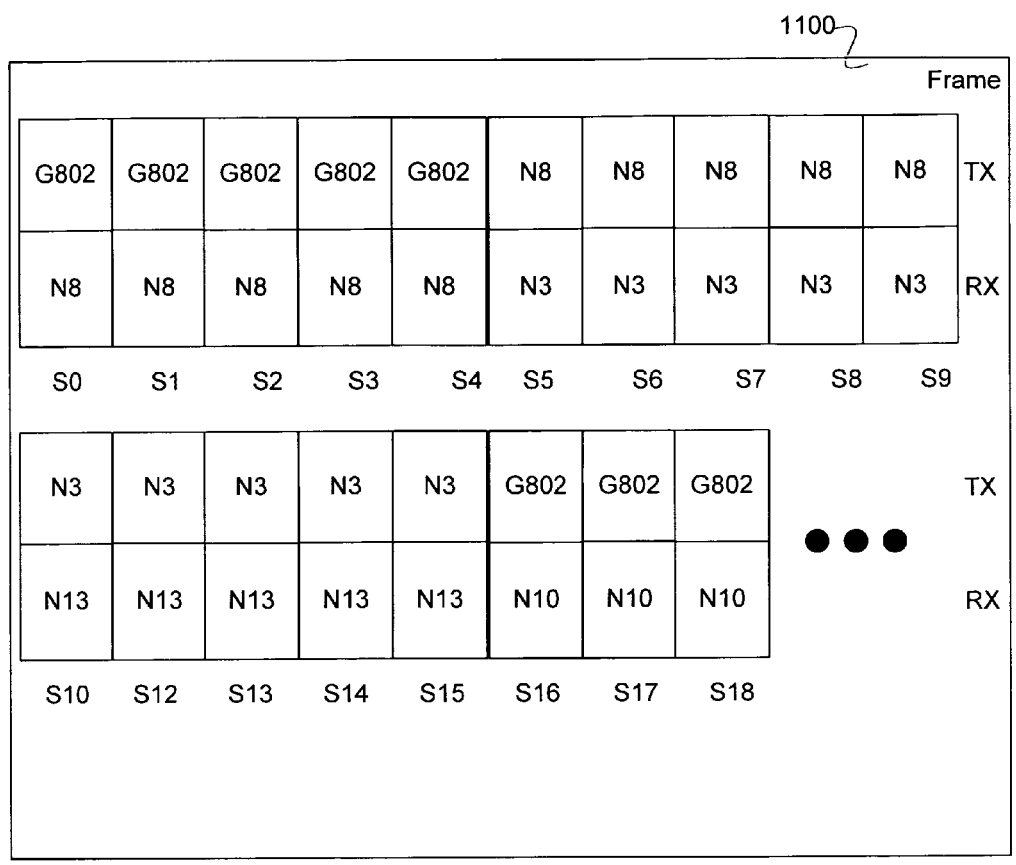
FIG. 11 is a block diagram illustrating an embodiment of a portion of a frame.

FIG. 11 is a block diagram illustrating an embodiment of a portion of a frame. In the example shown, the portion of frame 1100 is constructed using the calculated number of hops from FIG. 10 and a route from FIG. 8. Route 814 from G802 has 3 hops to N13. Slots S0, S1, S2, S3, and S4 show the 5 retries on the first hop of route 814 (G802 to N8). Similarly, S5-S9 show 5 retries on the second hop of route 814 (N8 to N3); And, S10-S14 show 5 retries on the third hop of route 814 (N3 to N13). FIG. 11 also shows three slots, S15-S17, with the first three retries for route 818 (G802 to N10). In various embodiments, frame 1100 can contain all of the routes for the network, one of the routes for the network, or a subset of the routes for the network, or any other appropriate routes for frame 1100.

Figure 12:
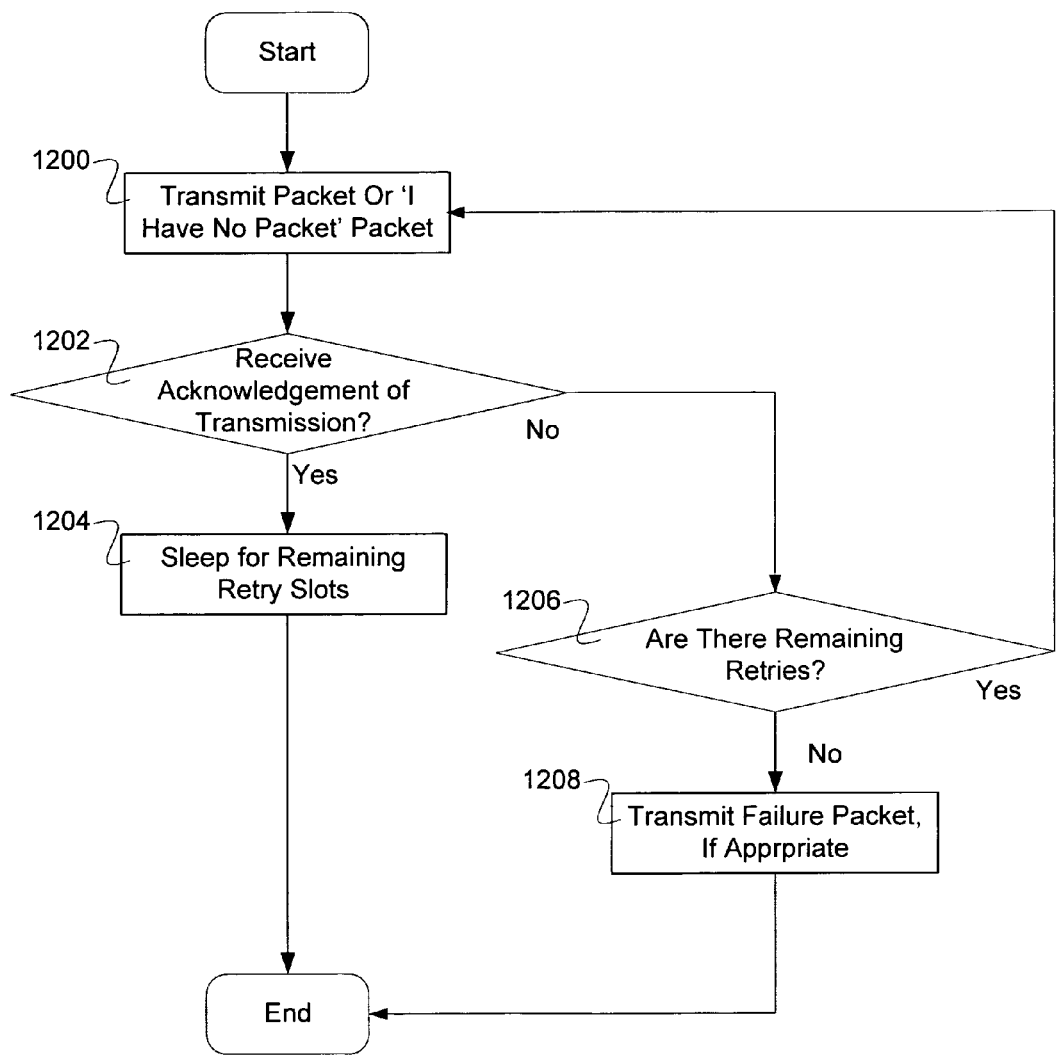
FIG. 12 is a flow diagram illustrating an embodiment of a process for transmitting a packet.

FIG. 12 is a flow diagram illustrating an embodiment of a process for transmitting a packet. In some embodiments, the process of FIG. 12 is used to transmit a retry as described in the slots of a frame such as Frame 1100 of FIG. 11. In the example shown, in 1200 a packet or a packet indicating 'I have no packet' is transmitted. In 1202, it is determined if the transmitter has received an acknowledgement of transmission. If so, then in 1204 the transmitter sleeps for the remaining retry slots and the process ends. If not, then in 1206 it is determined if there are any remaining retry slots. If so then, control passes to 1200. If not, then a failure packet is transmitted to a monitoring station (e.g., the gateway or administrator of the network), if appropriate, and the process ends.

Figure 13:
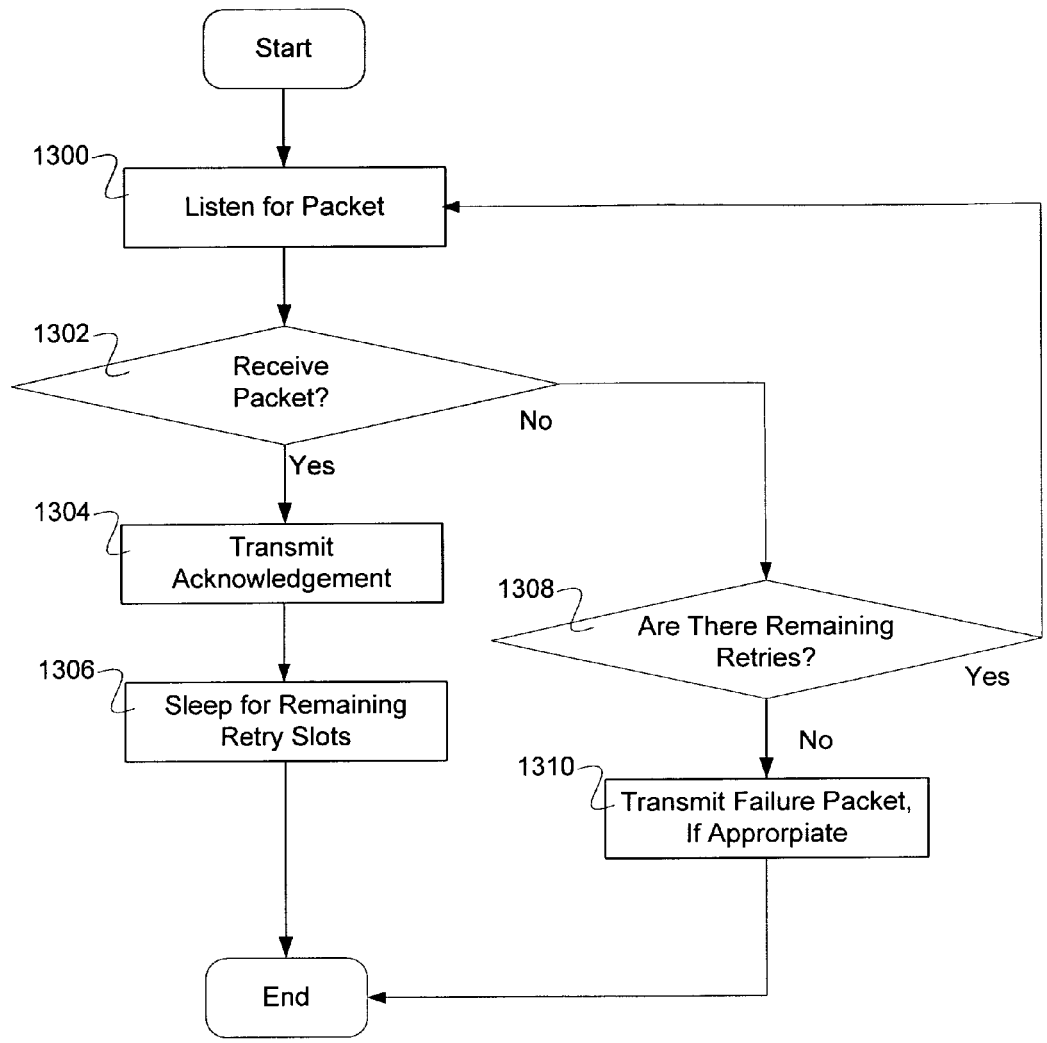
FIG. 13 is a flow diagram illustrating an embodiment of a process for receiving a packet.

FIG. 13 is a flow diagram illustrating an embodiment of a process for receiving a packet. In some embodiments, the process of FIG. 13 is used to receive a retry as described in the slots of a frame such as Frame 1100 of FIG. 11. In the example shown, in 1300 a packet is listened for. A receiver listens for a packet during a slot as designated by a frame for the network. In 1302, it is determined if the receiver has received a packet. If so, then in 1304 the receiver transmits an acknowledgement and in 1306 sleeps for the remaining retry slots. The process then ends. If the receiver has not received a packet, then in 1308 it is determined if there are any remaining retry slots during which to listen. If so then, control passes to 1300. If not, then a failure packet is transmitted to a monitoring station (e.g., the gateway or administrator of the network), if appropriate, and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for communicating using a mesh network, comprising:

selecting a frame length of a frame used for communicating a packet between a first node and a second node of a wireless mesh network, wherein the frame comprises a plurality of time slots, and wherein a transmitter node transmits a packet to a receiver node during one of the plurality of time slots of the frame, and wherein the frame length is selected based at least in part on a predetermined limit time for communicating the packet between the first node and the second node;

determining a route from the first node to the second node including one or more intermediate nodes that receive and transmit the packet; and selecting node to node communications within the frame along the route such that a communication latency time is below the predetermined limit time for a predetermined percentage of communications between the first node and the second node, wherein the communication latency time is achieved using a predetermined number of retries of a communication between two nodes that are part of a communication route between the first node and the second node, wherein the predetermined number of retries is based at least in part on the predetermined percentage of communications between the first node and the second node, wherein a retry slot comprises a time slot subsequent to a time slot assigned to the one node to node communication, wherein a first node to node communication is made using a first communication channel and a retry of the first node to node communication is made using a second communication channel, wherein the frame includes a set of retries for each hop along the route between the first node and the second node, wherein the set of retries for each hop is based at least in part on a reliability of communication between the first node and the second node, and wherein each retry uses a communication channel different from a communication channel used in a preceding retry or preceding communication.

2. A method as in claim 1, wherein the second node is downstream from the first node.

3. A method as in claim 1, wherein the route is one of a plurality of routes that covers all of the wireless mesh network nodes.

4. A method as in claim 1, wherein the communication latency time is achieved at least in part by selecting the route that reduces a maximum route length between the first node and the second node in network.

5. A method as in claim 1, wherein the communication latency time is achieved at least in part by selecting the route that reduces an expected number of transmissions along the route from the first node and the second node in network.

6. A method as in claim 1, wherein the frame length is equal to the predetermined limit time.

7. A method as in claim 1, wherein the node to node communications within the frame are selected such that in one frame a message can get from the first node to the second node.

8. A method as in claim 1, wherein the node to node communications within the frame are selected such that there are batches of communications along each of the paths wherein each batch includes retries of a predetermined node to node communication.

9. A method as in claim 1, further comprising activating a node in a route between the first node and the second node to use the frame for communicating by sending a source routed packet along the route.

10. A method as in claim 1, further comprising receiving an acknowledgement that a prior node to node communication was successfully received and not transmitting a communication retry based on receiving the acknowledgement.

11. A method as in claim 1, further comprising sending an acknowledgement that a prior node to node communication was successfully received and not receiving during a communication retry based on sending the acknowledgement.

12. A system for communicating using a mesh network, comprising:

a processor; and a memory coupled with the processor, wherein the memory is configured to provide the processor with instructions which when executed cause the processor to:

select a frame length of a frame used for communicating a packet between a first node and a second node of a wireless mesh network, wherein the frame comprises a plurality of time slots, and wherein a transmitter node transmits a packet to a receiver node during one of the plurality of time slots of the frame, and wherein the frame length is selected based at least in part on a predetermined limit time for communicating the packet between the first node and the second node;

determine a route from the first node to the second node including one or more intermediate nodes that receive and transmit the packet; and select node to node communications within the frame along the route such that a communication latency time is below the predetermined limit time for a predetermined percentage of communications between the first node and the second node, wherein the communication latency time is achieved using a predetermined number of retries of a communication between two nodes that are part of a communication route between the first node and the second node, wherein the predetermined number of retries is based at least in part on the predetermined percentage of communications between the first node and the second node, wherein a retry slot comprises a time slot subsequent to a time slot assigned to the one node to node communication, wherein a first node to node communication is made using a first communication channel and a retry of the first node to node communication is made using a second communication channel, wherein the frame includes a set of retries for each hop along the route between the first node and the second node, wherein the set of retries for each hop is based at least in part on a reliability of communication between the first node and the second node, and wherein each retry uses a communication channel different from a communication channel used in a preceding retry or preceding communication.

13. A computer program product for communicating using a mesh network, the computer program product being embodied in a non-transitory computer readable medium and comprising computer instructions executed by a processor for:

selecting a frame length of a frame used for communicating a packet between a first node and a second node of a wireless mesh network, wherein the frame comprises a plurality of time slots, and wherein a transmitter node transmits a packet to a receiver node during one of the plurality of time slots of the frame, and wherein the frame length is selected based at least in part on a predetermined limit time for communicating the packet between the first node and the second node;

determining a route from the first node to the second node including one or more intermediate nodes that receive and transmit the packet; and selecting node to node communications within the frame along the route such that a communication latency time is below the predetermined limit time for a predetermined percentage of communications between the first node and the second node, wherein the communication latency time is achieved using a predetermined number of retries of a communication between two nodes that are part of a communication route between the first node and the second node, wherein the predetermined number of retries is based at least in part on the predetermined percentage of communications between the first node and the second node, wherein a retry slot comprises a time slot subsequent to a time slot assigned to the one node to node communication, wherein a first node to node communication is made using a first communication channel and a retry of the first node to node communication is made using a second communication channel, wherein the frame includes a set of retries for each hop along the route between the first node and the second node, wherein the set of retries for each hop is based at least in part on a reliability of communication between the first node and the second node, and wherein each retry uses a communication channel different from a communication channel used in a preceding retry or preceding communication.

14. A device for communicating using a mesh network, comprising:

a transmitter;

a receiver;

a processor; and a memory coupled with the processor, wherein the memory is configured to provide the processor with instructions which when executed cause the processor to:

transmit a packet in a first slot of a frame using a first channel for a mesh network, wherein the frame comprises a plurality of time slots, and wherein a transmitter node transmits a packet to a receiver node during one of the plurality of time slots of the frame, wherein a frame length is selected based at least in part on a predetermined limit time for communicating the packet between the first node and the second node, wherein a communication latency time that is below the predetermined limit time for a predetermined percentage of communications between the first node and the second node is achieved using a predetermined number of retries of a communication between two nodes that are part of a communication route between the first node and the second node, and wherein the predetermined number of retries is based at least in part on the predetermined percentage of communications between the first node and the second node;

in the event that an acknowledgement that the packet was received after being sent in the first slot of the frame is not received, retry transmitting the packet in a second slot of the frame using a second channel designated for retrying the transmission of the first slot, wherein the frame includes a set of retries for each hop along a route between a first node and a second node, wherein the set of retries for each hop is based at least in part on a reliability of communication between the first node and the second node, and wherein each retry uses a communication channel different from a communication channel used in a preceding retry or preceding communication.

15. A device as in claim 14, further comprising in the event that the acknowledgement that the packet was received after being sent in the first slot of the frame is received, sleeping for the second slot of the frame designated for retrying the transmission of the first slot.

16. A device for communicating using a mesh network, comprising:

a transmitter;

a receiver;

a processor; and a memory coupled with the processor, wherein the memory is configured to provide the processor with instructions which when executed cause the processor to:

in the event that a packet was not received in a first slot of a frame on a first channel, retry listening for the packet in a second slot of the frame on a second channel designated for retrying the reception of the first slot, wherein the frame comprises a plurality of time slots, and wherein a transmitter node transmits a packet to a receiver node during one of the plurality of time slots of the frame, wherein a frame length is selected based at least in part on a predetermined limit time for communicating the packet between the first node and the second node, wherein a communication latency time that is below the predetermined limit time for a predetermined percentage of communications between the first node and the second node is achieved using a predetermined number of retries of a communication between two nodes that are part of a communication route between the first node and the second node, wherein the predetermined number of retries is based at least in part on the predetermined percentage of communications between the first node and the second node, wherein the frame includes a set of retries for each hop along a route between a first node and a second node, wherein the set of retries for each hop is based at least in part on a reliability of communication between the first node and the second node, and wherein each retry uses a communication channel different from a communication channel used in a preceding retry or preceding communication.

17. A device as in claim 16, further comprising in the event that a packet was received in a first slot of the frame, transmitting an acknowledgement that the packet was received and sleeping for a second slot of the frame designated for retrying the reception of the first slot.

18. A system as in claim 12, wherein the second node is downstream from the first node.

19. A system as in claim 12, wherein the route is one of a plurality of routes that covers all of the wireless mesh network nodes.

20. A system as in claim 12, wherein the communication latency time is achieved at least in part by selecting the route that reduces a maximum route length between the first node and the second node in network.

21. A system as in claim 12, wherein the communication latency time is achieved at least in part by selecting the route that reduces an expected number of transmissions along the route from the first node and the second node in network.

22. A system as in claim 12, wherein the frame length is equal to the predetermined limit time.

23. A system as in claim 12, wherein the node to node communications within the frame are selected such that in one frame a message can get from the first node to the second node.

24. A system as in claim 12, wherein the node to node communications within the frame are selected such that there are batches of communications along each of the paths wherein each batch includes retries of a predetermined node to node communication.

25. A system as in claim 12, wherein the memory is further configured to provide the processor with instructions which when executed cause the processor to activate a node in a route between the first node and the second node to use the frame for communicating by sending a source routed packet along the route.

26. A system as in claim 12, wherein the memory is further configured to provide the processor with instructions which when executed cause the processor to receive an acknowledgement that a prior node to node communication was successfully received and not transmitting a communication retry based on receiving the acknowledgement.

27. A system as in claim 12, wherein the memory is further configured to provide the processor with instructions which when executed cause the processor to send an acknowledgement that a prior node to node communication was successfully received and not receiving during a communication retry based on sending the acknowledgement.

* * * * *